United States Patent
Nair

(10) Patent No.: US 9,722,715 B2
(45) Date of Patent: Aug. 1, 2017

(54) SYSTEMS AND METHODS FOR DETERMINING A TAG LOCATION

(71) Applicant: Satyajit Nair, Bengaluru (IN)

(72) Inventor: Satyajit Nair, Bengaluru (IN)

(73) Assignee: Tyco Fire & Security GmbH, Neuhausen AM Rheinfall (CH)

(*) Notice: Subject to any disclaimer, the term of this patent is extended or adjusted under 35 U.S.C. 154(b) by 21 days.

(21) Appl. No.: 14/933,591

(22) Filed: Nov. 5, 2015

(65) Prior Publication Data

US 2017/0063476 A1    Mar. 2, 2017

(30) Foreign Application Priority Data

Aug. 25, 2015  (IN) .......................... 2635/DEL/2015

(51) Int. Cl.

| | |
|---|---|
| *G06K 7/10* | (2006.01) |
| *G06K 19/06* | (2006.01) |
| *G06Q 10/08* | (2012.01) |
| *G08B 13/24* | (2006.01) |
| *H04B 17/27* | (2015.01) |
| *H04B 17/318* | (2015.01) |

(52) U.S. Cl.
CPC ......... *H04B 17/27* (2015.01); *G06K 7/10297* (2013.01); *G06K 7/10475* (2013.01); *G06K 19/06028* (2013.01); *H04B 17/318* (2015.01); *G06Q 10/087* (2013.01); *G08B 13/2462* (2013.01)

(58) Field of Classification Search
None
See application file for complete search history.

(56) References Cited

U.S. PATENT DOCUMENTS

| | | | |
|---|---|---|---|
| 9,472,075 B1* | 10/2016 | Simon ................ | G08B 13/2462 |
| 2011/0266342 A1* | 11/2011 | Forster ................ | G06K 7/0008 |
| | | | 235/385 |

* cited by examiner

*Primary Examiner* — Daniell L Negron
(74) *Attorney, Agent, or Firm* — Fox Rothschild LLP; Robert J. Sacco; Carol E. Thorstad-Forsyth

(57) ABSTRACT

Systems (100) and methods (400) for Radio Frequency Identification ("RFID") security tags. The methods comprise: concurrently reading the RFID security tags and locator tags to obtain unique identifiers thereof and Received Signal Strength Indicator ("RSSI") measurements therefore, where the RFID security tags are respectively coupled to inventory items located within a facility and the locator tags are placed at locations within the facility so as to respectively define a plurality of Zones Of Interest ("ZOIs") in which inventory items may reside; and determining which ZOI of the plurality of ZOIs each said RFID security tag resides within based at least on the RSSI measurements, a number of times each locator tag was read, read times specifying when the locator tags were read, differences in read times for the locator tags, and known locations of the locator tags.

20 Claims, 5 Drawing Sheets

SYSTEMS AND METHODS FOR DETERMINING A TAG LOCATION

FIELD OF THE INVENTION

This document relates generally to systems and methods for determining a tag location. More particularly, this document relates to Radio Frequency Identification ("RFID") based systems and methods for determining a tag location using a handheld reader, locator tags and a software algorithm.

BACKGROUND OF THE INVENTION

RFID technology has conventionally been used in the identification and tracking of products, equipment, and other articles. For example, RFID systems are commonly used in Electronic Article Surveillance ("EAS") and in logistical and inventory systems for monitoring goods and equipment and recording information on the target item. An RFID system typically includes an RFID reader and an RFID device such as a tag or label. The RFID reader may transmit a Radio-Frequency ("RF") carrier signal to the RFID device. The RFID device may respond to the RF carrier signal (or interrogator signal) with a data response signal (or authentication reply signal) encoded with information stored on the RFID device. RFID devices may store information such as a unique identifier or an Electronic Product Code ("EPC") associated with an article or item.

The RFID technology allows business owners and other persons to rapidly and/or continuously (a) identify products, assets and people, (b) count products, assets and people, and (c) track locations of products, assets and people. As such, the RFID technology offers significant benefits over a physical inventory counting process. By leveraging the RFID technology to increase inventory accuracy, retailers are better able to perform replenishment, service customer requests, manage product recalls or any other activities that rely on inventory data. Products on the market today to aid in determining a product's identification and/or location are too expensive, bulky and/or heavy. For example, some handheld RFID tag readers are bulky, heavy and need to be physically carried by a person through a facility. Cellphone integrated RFID tag readers are expensive since a special dongle is needed for enabling the RFID tag reading operations.

Despite the advantages of the above described RFID solutions, they do not provide knowledge of where in a facility the inventory is kept. Knowledge of this can help retailers in a number of ways. Therefore there is a need for an improved inventory solution.

SUMMARY OF THE INVENTION

The present disclosure concerns implementing systems and methods for locating RFID security tags. The methods involve concurrently reading the RFID security tags and locator tags to obtain unique identifiers thereof and Received Signal Strength Indicator ("RSSI") measurements therefore. The RFID security tags are respectively coupled to inventory items located within a facility. The locator tags are placed at locations within the facility so as to respectively define a plurality of Zones Of Interest ("ZOIs") in which inventory items may reside. Thereafter, a determination is made as to which ZOI of the plurality of ZOIs each RFID security tag resides within. This determination is based at least on the RSSI measurements, a number of times each locator tag was read, read times specifying when the locator tags were read, differences in read times for the locator tags, and known locations of the locator tags. Accuracy of the determining may be increased using barcodes.

In some scenarios, the method further comprises identifying and eliminating each stray locator tag based on at least one of the number of times the stray locator tag was read, an RSSI measured for the stray locator tag, and a difference in read times between the stray locator tag and another locator tag.

In those or other scenarios, the duration of time a handheld reader spent reading RFID security tags and locator tags in each ZOI of the plurality of ZOIs is determined. The duration of time is determined based on Start Read Time ("SRT") and End Read Time ("ERT). The SRT comprises (a) a read time of a locator tag which was the first locator tag read in a given ZOI or (b) a read time that creates a largest difference during a change between reading location tags in a first ZOI and reading tags in a second ZOI. The ERT comprises (a) a read time of a locator tag which was the last locator tag read in any given ZOI or (b) a read time prior to a read time that creates a largest difference during a change between reading location tags in a first ZOI and reading tags in a second ZOI. Next, it is determined whether read times for each RFID security tag fall within the duration of time. If the read times for the RFID security tag do fall within the duration of time, then a conclusion is made that the RFID security tag is located within the ZOI.

In some scenarios, a conclusion may be made that at least one RFID security tag resides in at least a first ZOI and a second ZOI. In this case, the RFID security tag is assigned to the first ZOI when the RFID security tag's total number of reads and average signal strength associated with the first ZOI have higher values than the RFID security tag's total number of reads and average signal strength associated with the second ZOI, respectively. In another case, the RFID security tag is assigned to the second ZOI when the total number of reads and average signal strength associated with the second ZOI is higher than those associated with the first ZOI. In contrast, the RFID security tag is assigned to the first or second ZOI in which other inventory items belonging to the same product category as the inventory object to which the RFID security tag is coupled, when the RFID security tag's total number of reads and average signal strength associated with both ZOIs cannot clearly distinguish where it belongs to.

DESCRIPTION OF THE DRAWINGS

Embodiments will be described with reference to the following drawing figures, in which like numerals represent like items throughout the figures, and in which.

DETAILED DESCRIPTION OF THE INVENTION

Figure 1:
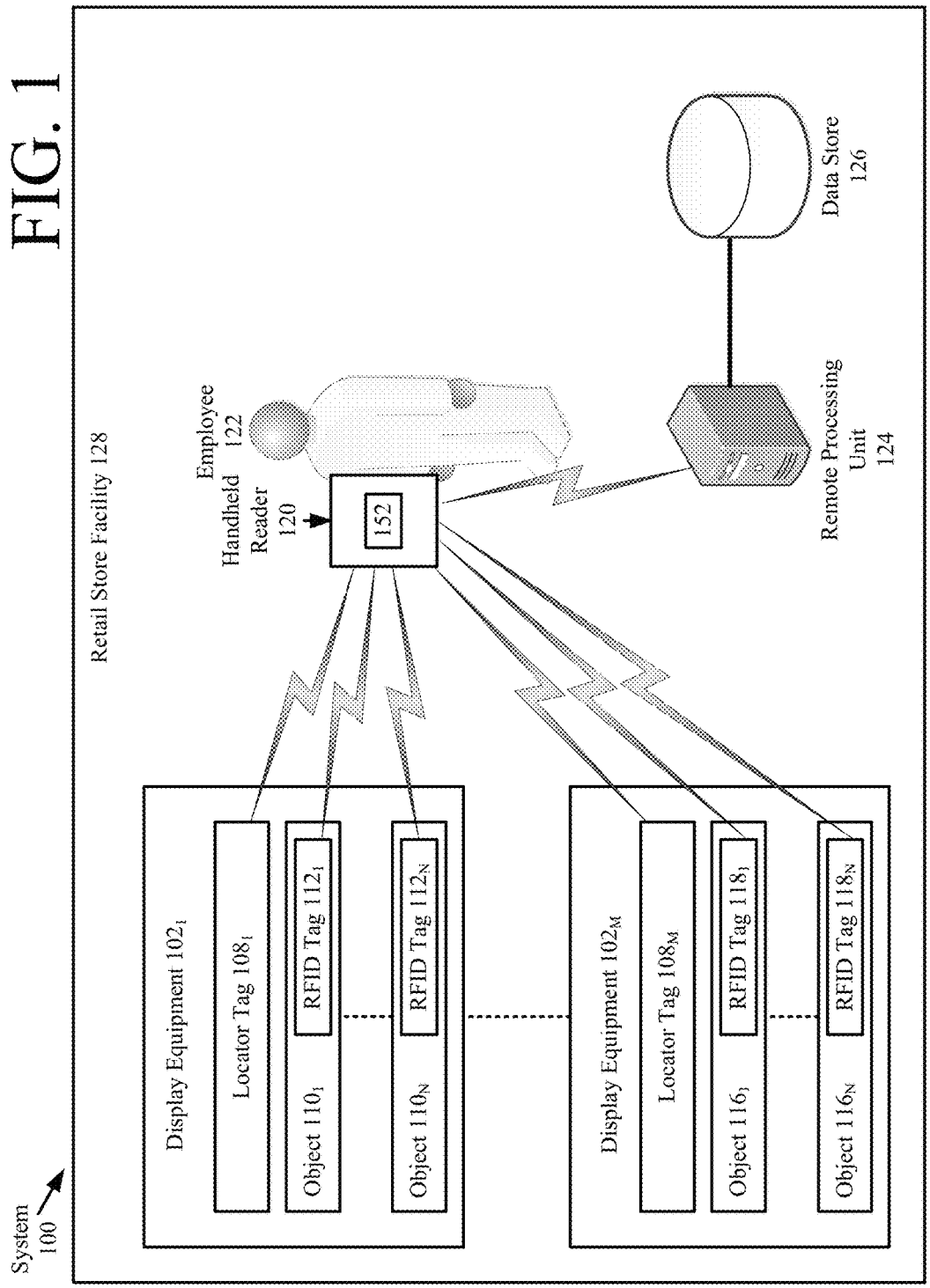
FIG. 1 is an illustration of an exemplary system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

As noted above, RFID solutions have been traditionally used to maintain inventory accuracy within a facility. However, there is no simple solution that provides knowledge of where in the facility this inventory is kept. Knowledge of this can help retailers in a number of ways.

Some indoor positioning techniques involve the use of Wi-Fi, Bluetooth, RFID, Light Emitting Diodes ("LEDs"), and/or magnetic fields. Global Positioning Systems ("GPSs") have met the need for outdoor location sensing. However, when it comes to indoor areas, GPS is not reliable due to poor reception of satellite signals. RFID solutions usually consist of using a handheld reader that scans the RFID tags attached to the products, identifies each product, and maintains an inventory of the products.

The proposed solution described herein can be easily and cost-effectively incorporated into any existing RFID solution that is used for inventory tracking. This solution would use a combination of locator tags and a software algorithm. The location tags provide a means for identifying a smaller region of a facility where inventory is kept. The software algorithm uses signal strength measurements, number of reads, and read times to determine a location of each product to which an RFID tag is attached, as described below.

Most solutions, that have tried to resolve the location of tags within facilities, have generally needed external hardware, which is required to be incorporated into the facility's infrastructure. The present solution described herein has the only requirement of inexpensive locator tags to be attached to certain regions in the facility where merchandise is kept. This requirement will not change the facility setup. Any handheld reader and backend software that is being used for inventory counting can still be used with changes to only the software thereof. The novelty of the present solution lies in the software algorithm that uses various parameters collected during inventory counting in order to determine the location of tags.

Accordingly, the present disclosure concerns systems and methods for locating RFID tags within a facility. The methods generally involve: disposing locator tags (e.g., fixed passive RFID tags and/or barcode labels) throughout at least a portion of a facility at strategic locations where items are generally kept (e.g., shelves, tables, etc.). The unique location identifiers and locations of the locator tags are known and stored in a data store for later use in determining an item's location. Notably, the locator tag set-up is the only extra one-time step that needs to be performed before inventory counting is performed. Since the locator tags can be implemented using passive RFID tags and/or barcode labels, the cost of the present solution is relatively low.

After setting-up the locator tags, a handheld reader is used for reading the locator and RFID security tag's unique identifiers and measuring signal strengths of received signals transmitted therefrom. The handheld reader also keeps track of the number of reads and read times. The locator and RFID security tag's unique identifiers, signal strength measurements, number of reads and read times is sent to an RPU. The RPU uses the signal strength measurements, read times and number of reads of the locator and RFID security tags to determine which RFID security tags are in proximity to each of the locator tags. This information allows the RPU to know where the RFID security tags reside within a facility since the locations of the locator tags are known.

Exemplary System

Referring now to FIG. 1, there is provided a schematic illustration of an exemplary system 100 that is useful for understanding the present invention. The present invention is described herein in relation to a retail store environment. The present invention is not limited in this regard, and can be used in other environments. For example, the present invention can be used in distribution centers, factories and other commercial environments. Notably, the present invention can be employed in any environment in which objects and/or items need to be located and/or tracked.

The system 100 is generally configured to allow improved object and/or item locating within a facility using various types of communication and sensor technologies. As shown in FIG. 1, system 100 comprises a Retail Store Facility ("RSF") 128 in which display equipment $102_1, \ldots, 102_M$ is disposed. The display equipment is provided for displaying objects (or items) $110_1$-$110_N$, $116_1$-$116_N$ to customers of the retail store. The display equipment can include, but is not limited to, shelves, article display cabinets, promotional displays, fixtures and/or equipment securing areas of the RSF 128. The RSF can also include emergency equipment (not shown), checkout counters and an EAS system (not shown). Emergency equipment, checkout counters, and EAS systems are well known in the art, and therefore will not be described herein.

Locator tags $108_1, \ldots, 108_M$ are located at strategic locations within the RSF 128. In some scenarios, the locator tags are disposed on display equipment $102_1, \ldots, 102_M$, as shown in FIG. 1. Additionally or alternatively, the locator tags are disposed on emergency equipment, checkout counters, walls, ceilings, and/or EAS system equipment (e.g., pedestals near and entrance/exit of the RSF). Locator tags are well known in the art, and therefore will not be described herein. Still, it should be understood that the locator tags are generally configured to facilitate a periodic or continuous determination of locations of the objects within the RSF 128. In this regard, the locator tags may include passive RFID tags.

In some scenarios, more than one locator tag is attached to each piece of display equipment for increasing the accuracy of the RFID tag locating. For example, one or more locator tags $108_1, \ldots, 108_M$ are placed on or in proximity to each piece of display equipment for improving location accuracy by providing additional location data. Accordingly, a locator tag is placed on each side of a table or shelf. Alternatively or additionally, a locator tag is placed on each shelf of multi-shelf display equipment. A locator tag can include, but is not limited to, an RFID tag mounted on a wall, ceiling, ground or equipment for which a location is known. The locator tag is oriented to be easily read. The present invention is not limited to the particulars of this example.

Additionally or alternatively, the accuracy is further increased by disposing barcode labels on the display equipment. A barcode can identify display equipment without ambiguity as its scanning is based on line-of-sight. In barcode scenarios, a user needs to toggle between the following two operational modes of a handheld reader 120: a barcode reading mode; and a tag reading mode. The barcode would need to be read prior to proceeding to scan the locator and RFID tags.

The locator tags $108_1, \ldots, 108_M$ are positioned so as to define respective ZOIs or regions. The locations of the ZOIs are known. Each ZOI is identified by the location Identifier ("ID") transmitted from a respective locator tag. The locator tags can be arranged so that their ZOIs do or do not overlap. Each ZOI contains the items to be inventoried and located. The size of the ZOI depends on the location accuracy. In some exemplary cases, the ZOI is less than a one (1) meter radius. The RSF 128 has a plurality of ZOIs. A single ZOI could encompass a single shelf, rack or table. The present invention is not limited to the particulars of this example.

By correlating RFID tag reads and the location ID received from a locator tag, it is possible to determine the location of objects $110_1, \ldots, 110_N, 116_1, \ldots, 116_N$ within the RSF 128. In this regard, it should be understood that information is stored in a data store 126 that specifies the known locations of the locator tags in three dimensional space, locator tag identifiers, ZOIs respectively associated with the locator tag identifiers, RFID tag identifiers, and information specifying product categories associated with the objects to which the RFID tags are respectively coupled. This information can be stored in the data store 126 using a RPU 124. RPU 124 will be described in more detail below in relation to FIG. 2.

A handheld reader 120 is provided for communicating with the locator tags $108_1, \ldots, 108_M$ and RFID tags $112_1, \ldots, 112_N, 118_1, \ldots, 118_N$. In this regard, the handheld reader 120 is designed to transmit signals to and receive signals from the locator tags and/or RFID tags when placed with the ZOIs, respectively. Each locator and RFID tag has a unique ID associated therewith. When the handheld reader 120 reads a locator or RFID tag, it obtains the unique ID. Information is stored in database 126 which specifies the known locations of the locator tags. Accordingly, RFID tags $112_1, \ldots, 112_N$ read in time proximity with a locator tag can be assigned to the approximate same location (e.g., a particular shelf, table or other piece of display equipment).

As noted above, the handheld reader 120 is generally configured to read RFID tags $112_1, \ldots, 112_N, 118_1, \ldots, 118_N$ and the locator tags $108_1, \ldots, 108_M$. The RFID tags $112_1$-$112_N$, $118_1$-$118_N$ are respectively coupled to the objects $110_1$-$110_N$, $116_1$-$116_N$. The RFID and locator tags are described herein as comprising single-technology tags that are only RFID enabled. The present invention is not limited in this regard. The RFID and locator tags can alternatively or additionally comprise dual-technology tags that have both EAS and RFID capabilities.

In some scenarios, the handheld reader 120 operates in a static configuration. The operator sets the power and other RFID parameters before reading tags to inventorying the same. The whole inventory of tags is performed with the configuration set at the start of the inventorying process.

In other scenarios, the handheld reader 120 operates in a dynamic configuration. The handheld reader 120 dynamically adapts its parameters based on whether or not it is present within a ZOI. When the handheld reader 120 is not present within a ZOI, the handheld reader 120 operates in a default mode, i.e., using a maximum power and reading RFID tags only once to ensure inventory accuracy in a timely manner. When the handheld reader 120 is within a ZOI, the handheld reader 120 operates in a location mode, i.e., it toggles between reads at high power and reads at low power. The power used to read an RFID tag is inversely proportional to a tag location confidence factor. That is, the lower the power used to read an RFID tag, the higher the tag location confidence. High power reads ensure inventory accuracy, while low power reads allow location accuracy. In location mode, an RFID tag can be read multiple times to allow the correlation logic to re-allocate an RFID tag from one location to another. The power can be dynamically adjusted depending on the RFID tag density being read. As inventory accuracy has to be maintained, the power applied in location mode can be reduced in case of dense tag population, and vice versa.

Notably, locator tags are read multiple times during an inventory count of a ZOI. The read time for each read is captured. In some scenarios, the received signal strength typically falls within −30 dBm to −80 dBm for a handheld reader of output power 800 mW. Signals of strength −30 dBm are typically considered relatively strong signals and indicate that a locator tag is less than a foot away from the handheld reader. As the signal strength recedes towards −80 dBm, it suggests that the signal is fading and that the locator tag is further away from the handheld reader. Filters may be applied by the RPU 124 to ignore tag reads of relatively low signal strength.

During operation of system 100, RFID tag location is performed by allocating a ZOI to each RFID tag. The ZOI is identified by the location ID received from a locator tag when the RFID tag are being read by the handheld reader 120. As the locator tag's position is known and associated with a unique location ID, the physical location of the RFID tag is deduced and located as being within the ZOI of the locator tag.

In some scenarios, two or more ZOIs overlap or RFID tags may be read from an adjacent ZOI, which causes cross-reads to occur. A cross-read is a tag read from a first ZOI to a second ZOI. Cross-reads cause location conflicts and may reduce location accuracy. In order to resolve location conflicts, a location confidence is computed for each location ID and for each tag involved. The location confidence is computed based on the number of reads, an average RSSI, a max RSSI and the handheld reader's power level at the time of a tag read. The tag location is deducted from the location ID having the highest location confidence value. An RFID tag can be declared between multiple locations if there is no clear winner based on the location confidences.

An RFID tag $112_1, \ldots, 112_N$ may be used as a locator tag if its determined location is considered as having a high degree of confidence. In this scenario, the locator tag reads adjust the location confidence for each RFID tag read in close time proximity. Tag reads around the same time as a locator tag have a higher probability to be in the same ZOI as the locator tag. The locator tag reads are also used to provide approximate positions within the ZOI reducing the location granularity. The locator tag reads also help to approximate the height of the surrounding RFID tags enabling three dimensional mapping.

The tag location in regards to locator tags is performed when both tags have been read at a relatively lower power (short range). Since the usage of low power reduces the inventory accuracy and/or slows down the process, it should be performed only when necessary. The handheld reader 120 will operate in default mode most of the time (i.e., read using a relatively high power), and operate in location mode only when close to objects (i.e., read using a relatively low power). The location mode is triggered when a locator tag is read along a relatively high RSSI. The location mode is maintained for a certain period of time. The time period is renewed when a reader trigger event reoccurs. A low power read on a locator tag is also an event renewing the location mode period.

The location mode can also be triggered by detecting the proximity of items or obstacles. In this case, the handheld reader is equipped with a proximity sensor 152 (e.g., an acoustic sensor or infrared sensor). The proximity sensor 152 detects the distance from the handheld reader to the RFID tags being read. A distance threshold value can be applied to trigger the location mode. The distance can be used to adjust the read power of the handheld reader. The distance can be used to compute more precise tag locations.

The tag locations are achieved by considering tag reads in close time proximity with a locator tag read as approximately in the same location. The lower the read power used, the higher the tag location confidence. The location confidence is computed based on the number of reads, an average RSSI, a maximum RSSI and the handheld reader's power level used to read the RFID tags. An RFID tag's location is deduced from the locator tag position having clearly the higher location confidence value. An RFID tag can be declared between multiple locations if there is no clear winner based on the location confidences.

Alternatively, a different logic is employed that consists of recoding a time window centered on the timestamp of each locator tag read. All those time windows chronologically aligned create a timeline of the handheld reader's location as each time window corresponds to a tag locator for which its location is known.

For each RFID tag, the read having the highest RSSI is selected and the timestamp of this read is used with the timeline. If the timestamp is included in a recorded time window of the timeline, the location is deduced from the location of the corresponding locator tag.

When two time windows overlap, the one created from the read having the highest RSSI takes over the overlapping time period. The applied time window widths can be adjusted based on the RSSI locator tag reads. The higher the RSSI, the wider the time window and vice versa. As a result, a tag locator read having higher RSSI takes priority while a tag locator read occurring at lower RSSI would have their time window reduced or filtered.

The ZOI coverage and locator tag positions have to be known to enable tag location. This mapping can be done by taking physical measurements. Additionally or alternatively, a fingerprint technique is employed. Using the handheld reader 120 with a touch screen, a user records received location IDs while pinpointing (his) her position on a map displayed on the touch screen. By doing so, the ZOIs are mapped to physical locations and maintained in a database. The same process can be applied to locator tags. A user scans a locator tag while pinpointing (her)his location on the map. The scanning can be done by: reading a two dimensional barcode printed on a locator tag; and/or RFID reads at very close range to the locator tag.

Figure 2:
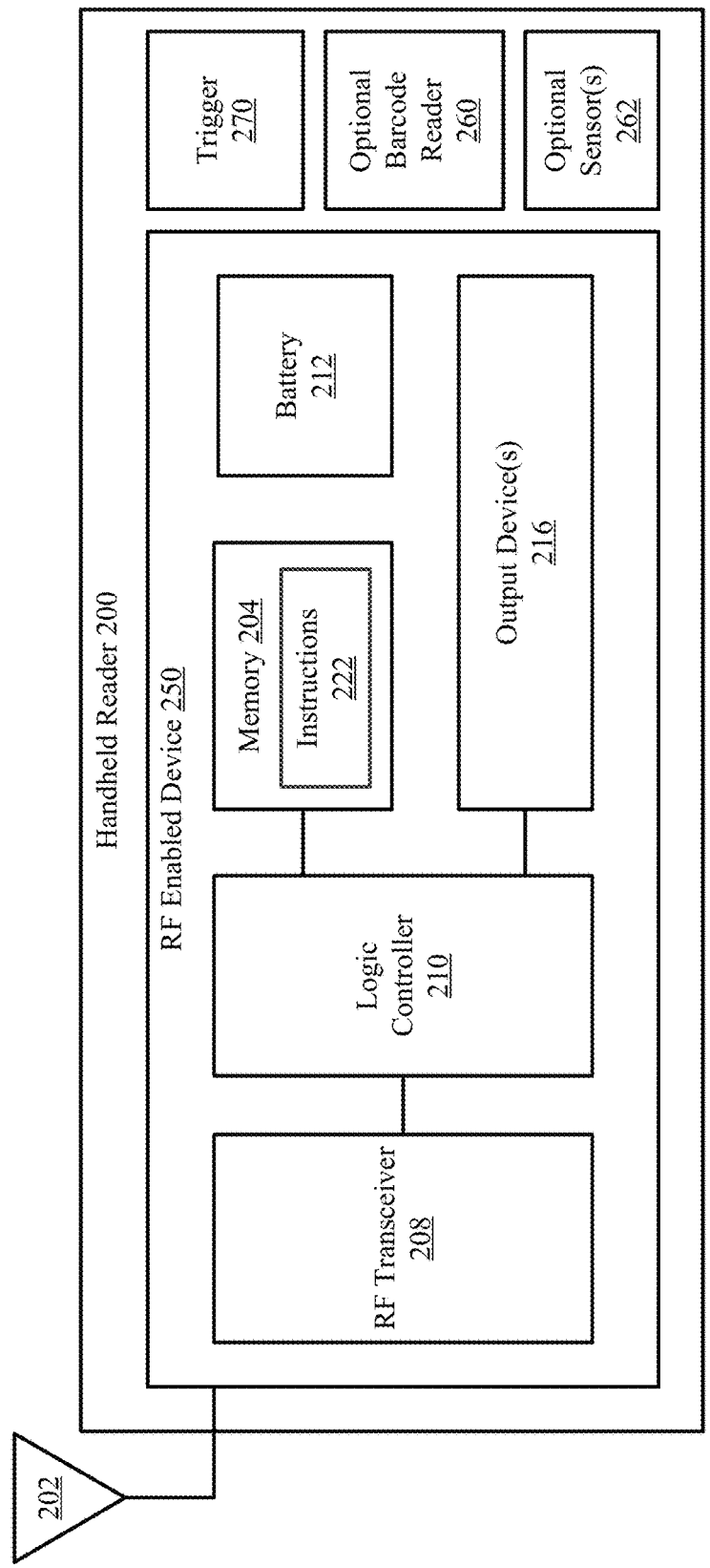
FIG. 2 is a block diagram of an exemplary architecture for a handheld reader.

Referring now to FIG. 2, there is provided a detailed block diagram of an exemplary architecture for a handheld reader 200. Handheld reader 120 of FIG. 1 is the same as or similar to handheld reader 200. As such, the discussion of handheld reader 200 is sufficient for understanding handheld reader 120.

Handheld reader 200 may include more or less components that that shown in FIG. 2. However, the components shown are sufficient to disclose an illustrative embodiment implementing the present invention. Some or all of the components of the handheld reader 200 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 2 represents an embodiment of a representative handheld reader 200 configured to facilitate improved object locating within an RSF (e.g., RSF 128 of FIG. 1). In this regard, the handheld reader 200 comprises an RF enabled device 250 for allowing data to be exchanged with an external device (e.g., locator tags $108_1, \ldots, 108_M$, and/or RFID tags $112_1, \ldots, 112_N$, $118_1, \ldots, 118_N$ of FIG. 1) via RF technology. The components 204-216 shown in FIG. 2 may be collectively referred to herein as the RF enabled device 250, and include a power source 212 (e.g., a battery).

The RF enabled device 250 comprises an antenna 202 for allowing data to be exchanged with the external device via RF technology (e.g., RFID technology or other RF based technology). The external device may comprise locator tags $108_1, \ldots, 108_M$, and/or RFID tags $112_1, \ldots, 112_N$, $118_1, \ldots, 118_N$ of FIG. 1. In this case, the antenna 202 is configured to transmit RF carrier signals (e.g., interrogation signals) to the listed external devices, and/or transmit data response signals (e.g., authentication reply signals) generated by the RF enabled device 250. In this regard, the RF enabled device 250 comprises an RF transceiver 208. RFID transceivers are well known in the art, and therefore will not be described herein. However, it should be understood that the RF transceiver 208 receives RF signals including information from the transmitting device, and forwards the same to a logic controller 210 for extracting the information therefrom.

In scenarios where the location determination is made by the handheld reader, the extracted information can be used to determine the location of an object (e.g., object $110_1, \ldots, 110_N, 116_1, \ldots,$ or $116_N$ of FIG. 1) within a facility (e.g., RSF 128 of FIG. 1). Accordingly, the logic controller 210 can store the extracted information in memory 204, and execute algorithms using the extracted information. For example, the logic controller 210 can correlate RFID tag reads with locator tag reads to determine the location of the object within the facility.

Notably, memory 204 may be a volatile memory and/or a non-volatile memory. For example, the memory 204 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 204 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 222 are stored in memory for execution by the RF enabled device 250 and that cause the RF enabled device 250 to perform any one or more of the methodologies of the present disclosure. The instructions 222 are generally operative to facilitate determinations as to where RFID tags are located within a facility. Other functions of the RF enabled device 250 will become apparent as the discussion progresses.

The handheld reader 200 may also comprise an optional barcode reader 260. The barcode reader 260 is generally configured to: read barcodes to obtain barcode information in response to a command signal; parsing unique IDs from barcode information; and communicating the unique IDs to the RF enabled device 250. The command signal can be generated by the RF enabled device 250 and sent to the barcode reader 260 in response to an operator's depression of a trigger 270.

The handheld reader 200 may further comprise an optional proximity sensor 262 (e.g., an acoustic sensor or infrared sensor). The proximity sensor 262 detects the distance from the handheld reader 200 to the RFID tags being read (e.g., RFID tags $112_1, \ldots, 112_N, 118_1, \ldots, 118_N$ of FIG. 1). A distance threshold value can be applied to trigger the location mode. The distance can be used to adjust the read power of the handheld reader. The distance can be used to compute more precise tag locations.

Figure 3:
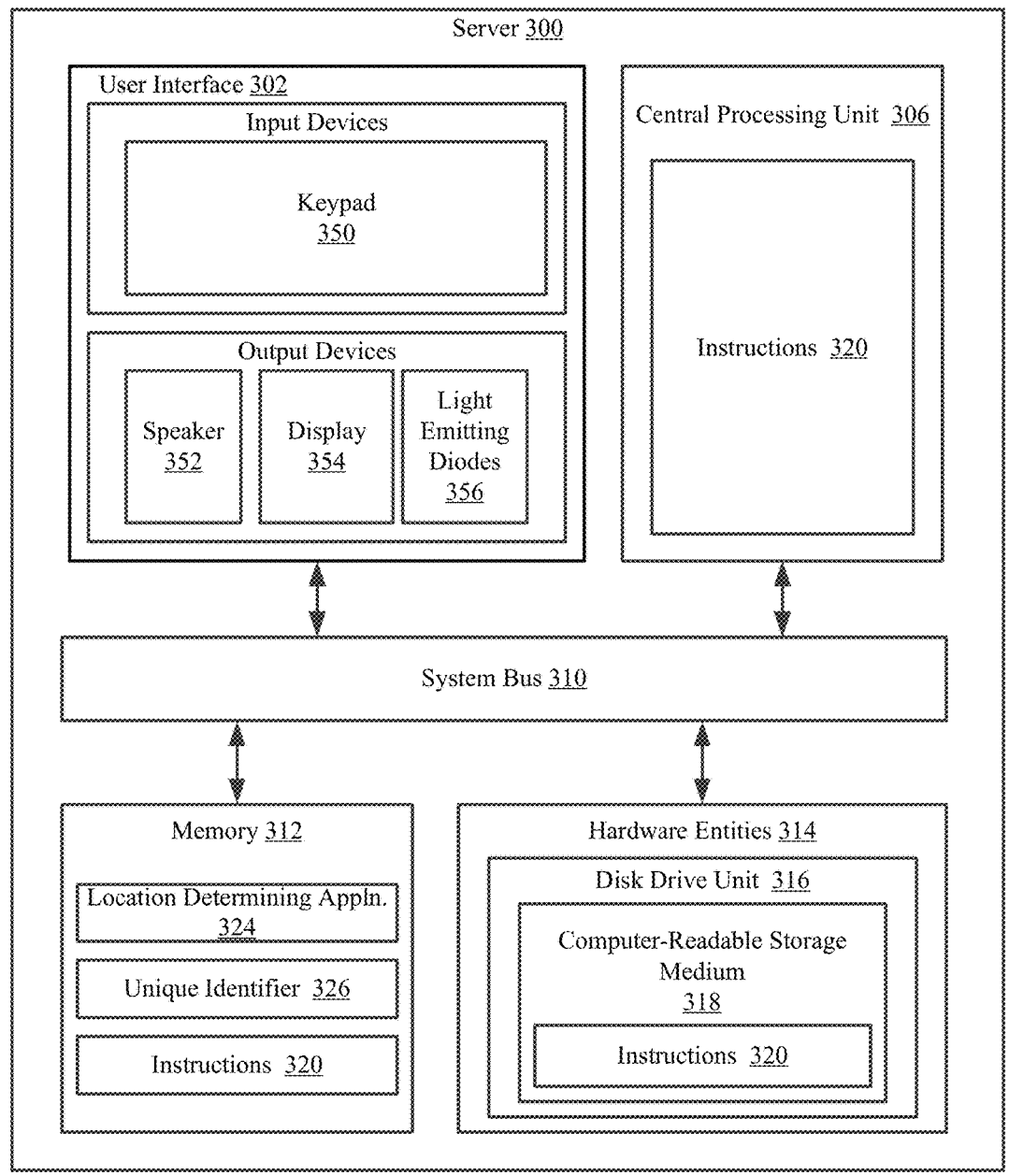
FIG. 3 is a block diagram of an exemplary architecture for an exemplary Remote Processing Unit ("RPU").

Referring now to FIG. 3, there is provided a detailed block diagram of an exemplary architecture for a RPU 300. RPU 124 of FIG. 1 is the same as or substantially similar to RPU 300. As such, the following discussion of RPU 300 is sufficient for understanding RPU 124.

Notably, the RPU 300 may include more or less components than those shown in FIG. 3. However, the components shown are sufficient to disclose an illustrative embodiment implementing the present invention. The hardware architecture of FIG. 3 represents one embodiment of a representative RPU configured to facilitate the provision of a three dimensional map showing locations of RFID tags (e.g., RFID tags $112_1, \ldots, 112_N, 118_1, \ldots, 118_N$ of FIG. 1) within an RSF (e.g., RSF 128 of FIG. 1). As such, the RPU 300 of FIG. 3 implements at least a portion of a method for providing such tag locations in accordance with embodiments of the present invention. Some or all the components of the RPU 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the RPU 300 comprises a user interface 302, a Central Processing Unit ("CPU") 306, a system bus 310, a memory 312 connected to and accessible by other portions of RPU 300 through system bus 310, and hardware entities 314 connected to system bus 310. The user interface can include input devices (e.g., a keypad 350) and output devices (e.g., speaker 352, a display 354, and/or light emitting diodes 356), which facilitate user-software interactions for controlling operations of the RPU 300.

At least some of the hardware entities 314 perform actions involving access to and use of memory 312, which can be a Random Access Memory ("RAM"), a disk driver and/or a Compact Disc Read Only Memory ("CD-ROM"). Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the RPU 300. The memory 312 and the CPU 306 also can constitute machine-readable media. The term "machine-readable media", as used here, refers to a single medium or multiple media (e.g., a centralized or distributed database, and/or associated caches and RPUs) that store the one or more sets of instructions 320. The term "machine-readable media", as used here, also refers to any medium that is capable of storing, encoding or carrying a set of instructions 320 for execution by the RPU 300 and that cause the RPU 300 to perform any one or more of the methodologies of the present disclosure.

In some embodiments of the present invention, the hardware entities 314 include an electronic circuit (e.g., a processor) programmed for facilitating the provision of a three dimensional map showing locations of RFID tags within a facility. In this regard, it should be understood that the electronic circuit can access and run a location determining application 324 installed on the RPU 300. The software application 324 is generally operative to facilitate: the determination of RFID tag locations within a facility; and the mapping of the RFID tag locations in a virtual three dimensional space. Other functions of the software application 324 will become apparent as the discussion progresses.

Notably, the RPU 300 can act as a learning system that keeps a history of locator tag reads, signal strengths, average read counts, average read durations and product categories/types respectively associated with ZOIs (or regions). The history information can be used in further location identification processes to define reference points against which RFID tag locations can be resolved.

Exemplary Methods for Locating an Object in a Facility

Figure 4A:
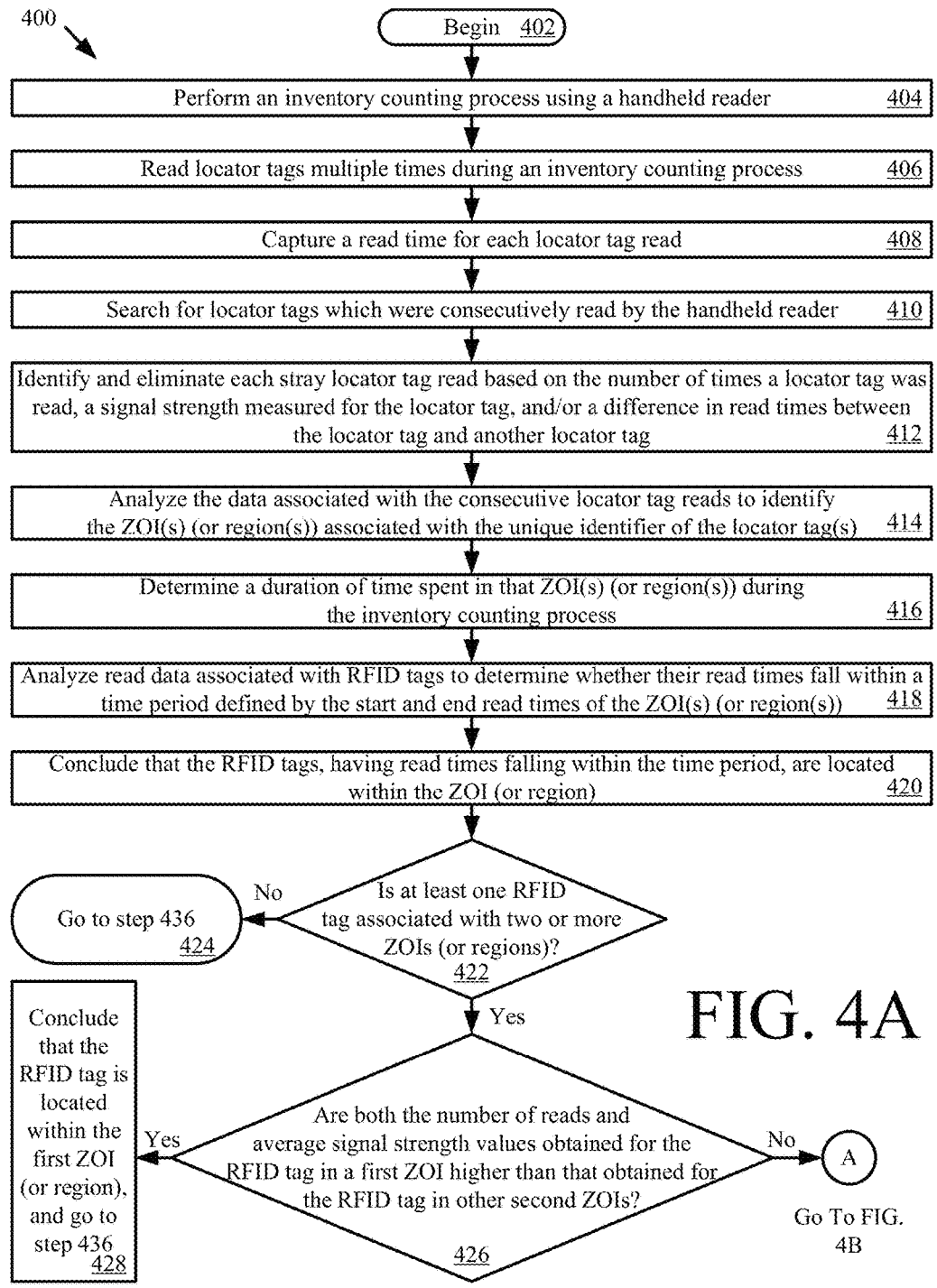
FIGS. 4A-4B (collectively referred to herein as "FIG. 4") provide a flow diagram of an exemplary method for determining a tag location.

Referring now to FIG. 4, there is provided a flow diagram of an exemplary method 400 for determining a location of an object within a facility. Method 400 begins with step 402 and continues with step 404 where an inventory counting process is performed using a handheld reader (e.g., handheld reader 120 of FIG. 1). Inventory counting processes are well known in the art, and therefore will not be described in detail herein. Still, it should be understood that the inventory counting process involves reading RFID tags (e.g., RFID tags $112_1, \ldots, 112_N, 118_1, \ldots, 118_N$ of FIG. 1) coupled to inventory objects (e.g., objects $110_1, \ldots, 110_N, 116_1, \ldots, 116_N$ of FIG. 1).

During the inventory counting process, multiple reads of locator tags (e.g., locator tags $108_1, \ldots, 108_M$ of FIG. 1) are performed as shown by step 406. The read times for the locator tag reads are captured in step 408. Next in step 410, a search is performed to identify locator tags which were consecutively read by the handheld reader. Stray locator tags are then identified based on the number of times a locator tag was read, a signal strength (or RSSI) measured for the locator tag, and/or a difference in read times between the locator tag and another locator tag. Read information associated with the identified stray locator tags is then eliminated from further analysis, as shown by step 412. Generally, when the user moves from one region to another the difference in the locator tag read times is much larger than that of the locator tag reads within a region.

Notably, the signal strength (or RSSI) typically has a value within −30 dBm and −80 dBm for a handheld reader of output power 800 mW. Signals of strength −30 dBm are typically very strong signals and indicate that a tag is less than a foot away. As the signal strength recedes towards −80 dBm, it suggests that the signal is fading and that the tag is further away from the handheld reader. Filters may be applied so that tag reads of relatively low signal strength are ignored.

Referring again to FIG. 4, step 414 involves analyzing the data associated with the consecutive locator tag reads to identify the ZOI (or region) associated with the unique identifier of the locator tag. Once the ZOI (or region) is identified, the duration of time spent in that ZOI (or region) is determined in step 416. In this regard, a Start Read Time ("SRT") and an End Read Time ("ERT") for the identified ZOI (or region) are determined. The SRT is either (a) the read time of the first tag in case of the identified ZOI (or region) (i.e., in the below samples of Table 1 the SRT would be T1 for location marked by LocRag1) or (b) the read time that creates the largest difference during change of location (i.e., in the below Table 1, if T7-T6 produces the largest difference during location change then T7 would be the SRT for location marked by LocTag2). The ERT is either (a) the read time prior to the one that creates the largest difference during change of locator tag read in the sequence (i.e., in the below Table 1, if T7-T6 produces the largest difference during location change then T6 would be the ERT for location marked by LocTag1) or (b) the read time of the last tag in case of the last ZOI (or region) (i.e., in the below Table 1 it would be T13 for location marked Loctag2).

Evident from the below Table 1, the inventory counting in the location marked by LocTag1 spanned from T1 to T6. The inventory counting for location marked by LocTag2 spanned from T7 to T13. The accuracy of the read time duration is important because we need to know the boundary of each region correctly.

TABLE 1

| Tag Read Sequence | Read Times | Delta |
|---|---|---|
| LocTag1 | T1 | |
| Tag1 | T2 | T2-T1 |
| Tag2 | T3 | T3-T2 |
| Tag3 | T4 | T4-T3 |
| LocTag1 | T5 | T5-T4 |
| Tag4 | T6 | T6-T5 |
| Tag5 | T7 | T7-T6 |
| Tag6 | T8 | T8-T7 |
| LocTag2 | T9 | T9-T8 |
| Tag7 | T10 | T10-T9 |
| Tag8 | T11 | T11-T10 |
| Tag9 | T12 | T12-T11 |
| LocTag2 | T13 | T13-T12 |

Referring again to FIG. 4, various steps are performed to determine which RFID tags (e.g., RFID tags $112_1, \ldots, 112_N, 118_1, \ldots, 118_N$ of FIG. 1) are located within the ZOI (or region). These steps include step 418 where read data is analyzed to determine whether RFID tag read times fall within the time period defined by the SRT and ERT. A conclusion is made that the RFID tags, having read times falling within the time period, are located within the ZOI (or region), as shown by step 420. From the above Table 1, Tag1-Tag4 lie in the region marked LocTag1 and Tag5-Tag9 lie in the region marked LocTag2. This is the first level of RFID tag location identification using the read times thereof.

In some scenarios, a particular RFID tag may be associated with two or more ZOIs (or regions), as shown by step 422. This may be due to the problem of cross-reads (i.e., locator tags from other ZOIs being read while reading RFID tags in a particular ZOI). If the RFID tag is associated with only one ZOI (or region) [422:NO], then step 424 is performed where method 400 continues with step 436 of FIG. 4B. Step 436 will be described below.

In contrast, if the RFID tag is associated with two or more ZOIs (or regions) [422:YES], then a second level of tag location identification is applied as shown by steps 426-428. Step 426 involves making a determination as to whether or not both the number of reads and average signal strength values obtained for the RFID tag in a first ZOI (or region) are higher than that obtained for the RFID tag in other second ZOIs (or regions). If both the number of reads and average signal strength values obtained for the RFID tag in the first ZOI (or region) are higher than that obtained for the RFID tag in the second ZOIs (or regions) [426:YES], then a conclusion is made in step 428 that the RFID tag is located within the first ZOI (or region). After making such a conclusion, method 400 continues with step 436 of FIG. 4B. Step 436 will be described below. If the number of reads value and/or average signal strength value obtained for the RFID tag in the first ZOI (or region) is/are lower than that obtained for the RFID tag in the second ZOIs (or regions) [426:NO], then method 400 continues with decision step 427 of FIG. 4B.

Figure 4B:
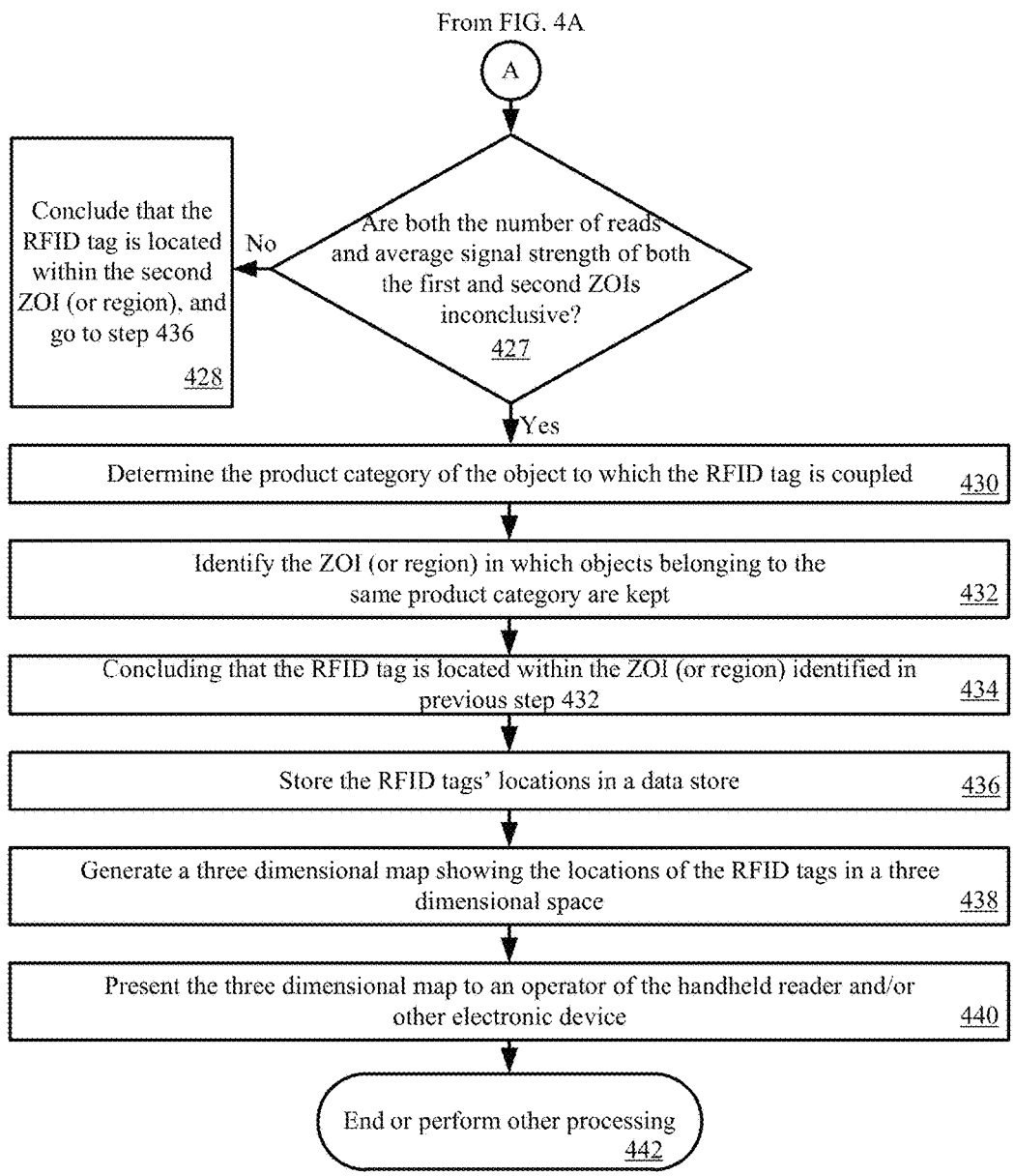

As shown in FIG. 4B, step 427 involves determining whether both the number of reads and average signal strength of both the first and second ZOIs are inconclusive. If it is determined that both the number of reads and average signal strength of both the first and second ZOIs are not inconclusive [427:NO], then step 428 is performed where a conclusion is made that the RFID tag is located within the second ZOI. In contrast, if both the number of reads and average signal strength of both ZOIs are determined to be inconclusive [427:YES], then method 400 continues with steps 430-434 of FIG. 4B in which a third level of RFID tag location identification is performed.

As shown in FIG. 4B, steps 430-434 involve: determining a product category of the object to which the RFID tag is coupled; identifying the ZOI (or region) in which objects belonging to the same product category are kept; and concluding that the RFID tag is located within the identified ZOI (or region). The premise for the third level of RFID tag location identification is that objects belonging to the same product category are kept in the same ZOI (or region) of a facility (e.g., a warehouse facility). Using this premise, for an RFID tag whose location determination is still ambiguous, an increased probability of being in a particular region is achieved by knowing the product category/type of the object to which the RFID tag is coupled and associating the RFID tag with the ZOI (or region) holding objects of the product category/type.

Upon completing step 434, step 436 is performed where the RFID tag's location is stored in a data store (e.g., data store 126 of FIG. 1). A three dimensional map is generated in step 438 showing the locations of the RFID tags in a three dimensional space. The three dimensional map is then presented to an operator of the handheld reader and/or other electronic device (e.g., RPU 124 of FIG. 1). Subsequently, step 442 is performed where method 400 ends or other processing is performed (e.g., return to step 402 of FIG. 4A).

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

I claim:

1. A method for locating Radio Frequency Identification ("RFID") security tags, comprising:
    concurrently reading the RFID security tags and a plurality of locator tags to obtain unique identifiers thereof and Received Signal Strength Indicator ("RSSI") measurements therefore, where the RFID security tags are respectively coupled to inventory items located within a facility and the locator tags are placed at locations within the facility so as to respectively define a plurality of Zones Of Interest ("ZOIs") in which inventory items may reside; and
    determining which ZOI of the plurality of ZOIs each said RFID security tag resides within based at least on the RSSI measurements, a number of times each locator tag was read, read times specifying when the locator tags were read, differences in read times for the locator tags, and known locations of the locator tags.

2. The method according to claim 1, further comprising identifying and eliminating each stray locator tag of a plurality of stray locator tags based on at least one of the number of times the stray locator tag was read, an RSSI measured for the stray locator tag, and a difference in read times between the stray locator tag and another locator tag.

3. The method according to claim 1, further comprising determining the duration of time a handheld reader spent reading RFID security tags and locator tags in each ZOI of the plurality of ZOIs.

4. The method according to claim 3, wherein the duration of time is determined based on Start Read Time ("SRT") comprising (a) a read time of a locator tag which was the first locator tag read in an given ZOI or (b) a read time that creates a largest difference during a change between reading location tags in a first ZOI and reading tags in a second ZOI.

5. The method according to claim 3, wherein the duration of time is determined based on an End Read Time ("ERT) comprising (a) a read time of a locator tag which was the last locator tag read in any given ZOI or (b) a read time prior to a read time that creates a largest difference during a change between reading location tags in a first ZOI and reading tags in a second ZOI.

6. The method according to claim 3, further comprising determining whether read times for each RFID security tag fall within the duration of time.

7. The method according to claim 6, further comprising concluding that the RFID security tags, having read times that fall within the duration of time, are located within the ZOI.

8. The method according to claim 1, further comprising:
    identifying at least one RFID security tag which has been determined to reside in at least a first ZOI and a second ZOI; and
    assigning the RFID security tag to the first ZOI when the RFID security tag's total number of reads and average signal strength associated with the first ZOI have higher values than the RFID security tag's total number of reads and average signal strength associated with the second ZOI, respectively.

9. The method according to claim 1, further comprising:
    identifying at least one RFID security tag which has been determined to reside in at least a first ZOI and a second ZOI;
    determining a product category of an inventory item to which the RFID security tag is coupled; and
    assigning the RFID security tag to the first or second ZOI in which other inventory items belonging to the product category are stored.

10. The method according to claim 1, further comprising increasing an accuracy of said determining using barcodes.

11. A system, comprising:
    a plurality of RFID security tags respectively coupled to inventory items located within a facility;
    a plurality of locator tags placed at locations within the facility so as to respectively define a plurality of Zones Of Interest ("ZOIs") in which inventory items may reside;
    an RFID reader configured to concurrently read the RFID security tags and the locator tags to obtain unique identifiers thereof and Received Signal Strength Indicator ("RSSI") measurements therefore; and
    a processing unit executing programming instructions which cause the processor to determine which ZOI of the plurality of ZOIs each said RFID security tag resides within based at least on the RSSI measurements, a number of times each locator tag was read, read times specifying when the locator tags were read, differences in read times for the locator tags, and known locations of the locator tags.

12. The system according to claim 11, wherein the processing unit is further caused to identify and eliminate each stray locator tag of a plurality of stray locator tags based on at least one of the number of times the stray locator tag was read, an RSSI measured for the stray locator tag, and a difference in read times between the stray locator tag and another locator tag.

13. The system according to claim 11, wherein the processing unit is further caused to determine the duration of time a handheld reader spent reading RFID security tags and locator tags in each ZOI of the plurality of ZOIs.

14. The system according to claim 13, wherein the duration of time is determined based on Start Read Time ("SRT") comprising (a) a read time of a locator tag which was the first locator tag read in an given ZOI or (b) a read time that creates a largest difference during a change between reading location tags in a first ZOI and reading tags in a second ZOI.

15. The system according to claim 13, wherein the duration of time is determined based on an End Read Time ("ERT) comprising (a) a read time of a locator tag which was the last locator tag read in any given ZOI or (b) a read time prior to a read time that creates a largest difference during a change between reading location tags in a first ZOI and reading tags in a second ZOI.

16. The system according to claim 13, wherein the processing unit is further caused to determine whether read times for each RFID security tag fall within the duration of time.

17. The system according to claim 16, wherein the processing unit is further caused to conclude that the RFID security tags, having read times that fall within the duration of time, are located within the ZOI.

18. The system according to claim 11, wherein the processing unit is further caused to:
identify at least one RFID security tag which has been determined to reside in at least a first ZOI and a second ZOI; and
assign the RFID security tag to the first ZOI when the RFID security tag's total number of reads and average signal strength associated with the first ZOI have higher values than the RFID security tag's total number of reads and average signal strength associated with the second ZOI, respectively.

19. The system according to claim 11, wherein the processing unit is further caused to:
identify at least one RFID security tag which has been determined to reside in at least a first ZOI and a second ZOI;
determine a product category of an inventory item to which the RFID security tag is coupled; and
assign the RFID security tag to the first or second ZOI in which other inventory items belonging to the product category are stored.

20. The system according to claim 11, wherein barcodes are used to increase an accuracy of the determination as to which ZOI of the plurality of ZOIs each said RFID security tag resides.

* * * * *